US012650830B2

(12) United States Patent (10) Patent No.: US 12,650,830 B2
Ishikawa et al. (45) Date of Patent: Jun. 9, 2026

(54) MOBILE TERMINAL AND SOFTWARE UPDATE SYSTEM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 18/494,296

(22) Filed: Oct. 25, 2023

(65) Prior Publication Data

US 2024/0143311 A1 May 2, 2024

(30) Foreign Application Priority Data

Nov. 1, 2022 (JP) ................................. 2022-175326

(51) Int. Cl.
| *G06F 8/658* | (2018.01) |
| *B60R 16/023* | (2006.01) |
| *G06F 8/61* | (2018.01) |
| *G06F 8/65* | (2018.01) |
| *G07C 5/00* | (2006.01) |

(52) U.S. Cl.
CPC .................. *G06F 8/65* (2013.01); *G06F 8/61* (2013.01); *G07C 5/008* (2013.01)

(58) Field of Classification Search
CPC .............. G06F 8/65; G06F 8/61; G07C 5/008
See application file for complete search history.

(56) References Cited

U.S. PATENT DOCUMENTS

| | | | | |
|---|---|---|---|---|
| 9,311,066 | B1* | 4/2016 | Garman .................. | H04L 67/10 |
| 2006/0069711 | A1* | 3/2006 | Tsunekawa ......... | G06F 11/1464 |
| | | | | 709/200 |
| 2015/0113520 | A1* | 4/2015 | Kotani ...................... | G06F 8/65 |
| | | | | 717/172 |
| 2015/0178067 | A1* | 6/2015 | Ji ........................... | G01C 21/36 |
| | | | | 717/170 |
| 2017/0060559 | A1* | 3/2017 | Ye ............................. | G06F 8/65 |
| 2017/0195896 | A1* | 7/2017 | Lee ........................ | H04W 8/245 |
| 2020/0057630 | A1* | 2/2020 | Cho .......................... | G06F 8/65 |

FOREIGN PATENT DOCUMENTS

| | | |
|---|---|---|
| JP | 2006-011717 A | 1/2006 |
| JP | 2016-060407 A | 4/2016 |
| JP | 2017-149323 A | 8/2017 |

* cited by examiner

*Primary Examiner* — S. Sough
*Assistant Examiner* — Mohammad H Kabir
(74) *Attorney, Agent, or Firm* — Finnegan, Henderson, Farabow, Garrett and Dunner, LLP

(57) ABSTRACT

A mobile terminal includes: one or more processors configured to acquire vehicle configuration information including information on an electronic control unit (ECU) mounted on a vehicle and transmit the vehicle configuration information to a server; and acquire software distributed from the server; and a communication module configured to transmit the software acquired by the first acquisition unit to the vehicle.

4 Claims, 9 Drawing Sheets

INSTALLATION SUSPENSION PROCESS

START

S41
ACQUIRE LOAD ON TARGET ECU

S42
LOAD ≥ α ?   YES

NO

S43
EXECUTE (RESUME) TRANSMISSION (INSTALLATION)

S44
SUSPEND TRANSMISSION (INSTALLATION)

S45
IS INSTALLATION COMPLETED?   NO

YES

END

INSTALLATION SUSPENSION PROCESS

START

S41 ACQUIRE LOAD ON TARGET ECU

S42 LOAD ≥ α ?

YES → S44 SUSPEND TRANSMISSION (INSTALLATION)

NO → S43 EXECUTE (RESUME) TRANSMISSION (INSTALLATION)

S45 IS INSTALLATION COMPLETED?

NO

YES → END

COMMUNICATION BREAKDOWN-TIME PROCESS

FIG. 9

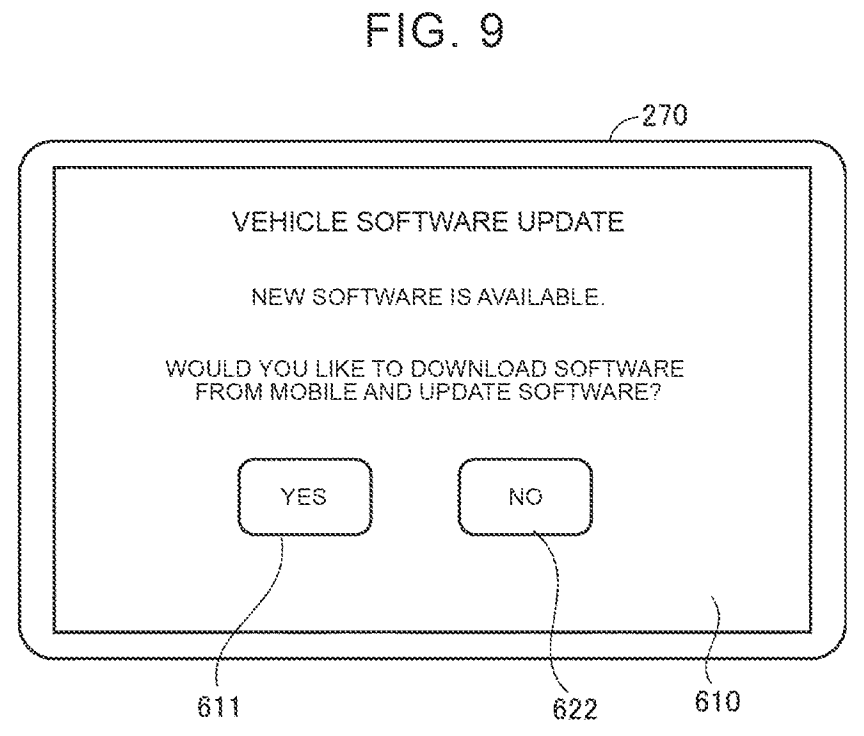

VEHICLE SOFTWARE UPDATE

NEW SOFTWARE IS AVAILABLE.

WOULD YOU LIKE TO DOWNLOAD SOFTWARE
FROM MOBILE AND UPDATE SOFTWARE?

YES

NO

270

610

622

611

MOBILE TERMINAL AND SOFTWARE UPDATE SYSTEM

CROSS-REFERENCE TO RELATED APPLICATION

This application claims priority to Japanese Patent Application No. 2022-175326 filed on Nov. 1, 2022, incorporated herein by reference in its entirety.

BACKGROUND

1. Technical Field

The present disclosure relates to a mobile terminal and a software update system.

2. Description of Related Art

Japanese Unexamined Patent Application Publication No. 2017-149323 (JP 2017-149323 A) discloses a technique of updating software of an electronic control unit (ECU) mounted on a vehicle by an Over The Air (OTA) technology.

SUMMARY

A vehicle can download new software (data) of an in-vehicle ECU by wirelessly communicating with an external server (e.g. an OTA center). In the vehicle, the software can be updated by a target ECU (an ECU as a target for software update) sequentially executing installation and activation of the software.

However, not all vehicles can wirelessly communicate with the OTA center. For vehicles that cannot wirelessly communicate with the OTA center, the software cannot be updated since the software is not distributed to the vehicle from the OTA center. It is desirable that the software can be updated by the OTA technology also for vehicles that do not support a function of wireless communicating directly with the OTA center (hereinafter occasionally referred to as an "OTA access function").

The present disclosure provides a mobile terminal and a software update system that enable software update by the OTA technology even for vehicles that do not support the OTA access function.

(1) A first aspect of the present disclosure provides a mobile terminal includes: one or more processors configured to acquire vehicle configuration information including information on an electronic control unit (ECU) mounted on a vehicle and transmit the vehicle configuration information to a server; and acquire software distributed from the server; and a communication module configured to transmit the acquired software to the vehicle.

With this configuration, the mobile terminal can communicate with the vehicle and the server. The configuration synchronization processing unit of the mobile terminal acquires vehicle configuration information including information on the ECU mounted on the vehicle, and transmits the vehicle configuration information to the server. This enables the server to distribute new (update) software to be applied to the vehicle to the mobile terminal. The first acquisition unit of the mobile terminal acquires the software distributed from the server. Then, the mobile terminal transmits the software acquired by the first acquisition unit to the vehicle via the communication unit. In this manner, the vehicle can update software by the OTA technology by obtaining new software by way of the mobile terminal.

(2) In the above aspect, the mobile terminal wherein: the one or more processors may be configured to: request a user to accept an update process for software of the ECU based on an acceptance request signal distributed from the server; instruct the ECU to execute installation of the software to be transmitted to the vehicle; and instruct the ECU to execute activation of the installed software.

With this configuration, the campaign notification processing unit of the mobile terminal requests the user to accept an update process for software of the ECU based on an acceptance request signal distributed from the server. This enables the software to be updated when the user accepts update of the software. The installation processing unit of the mobile terminal instructs the ECU to execute installation of the software to be transmitted to the vehicle, and the activation processing unit instructs the ECU to execute activation of the installed software. The software (new software) distributed from the server is installed and activated as instructed by the mobile terminal, and thus it is not necessary to provide a device etc. exclusively for software update.

(3) In the above aspect, the mobile terminal wherein the one or more processors may be configured to: acquire a load on the ECU; and instruct the ECU to suspend execution of the installation when the acquired load is equal to or more than a predetermined value.

With this configuration, the mobile terminal instructs the ECU to suspend execution of the installation when the load on the ECU is high at a predetermined value or more. This enables the installation to be performed appropriately, since the installation is suspended when the ECU (target ECU) as the target for the software update is subjected to a high load and trouble would be caused if the installation were executed.

(4) A second aspect of the present disclosure provides a software update system configured to update software of an electronic control unit (ECU), including: a server configured to distribute the software; a vehicle on which the ECU is mounted; and a mobile terminal configured to communicate with the server and the vehicle, in which: the mobile terminal is configured to acquire vehicle configuration information including information on the ECU from the vehicle, transmit the acquired vehicle configuration information to the server, acquire update software distributed from the server, and transmit the acquired update software to the vehicle; and the server is configured to determine presence or absence of the update software to be applied to the ECU when the vehicle configuration information is received from the mobile terminal, and distribute the update software to the mobile terminal when the update software to be applied to the ECU is present.

With this configuration, the mobile terminal is configured to be capable of communicating with the server and the vehicle. The mobile terminal acquires vehicle configuration information including information on the ECU from the vehicle, and transmits the vehicle configuration information to the server. The server determines the presence or absence of the update software to be applied to the ECU when the vehicle configuration information is received from the mobile terminal, and distributes the update software to the mobile terminal when the update software to be applied to the ECU is present. When the update software distributed from the server is acquired, the mobile terminal transmits the update software to the vehicle. In this manner, the vehicle can update software by the OTA technology by obtaining new software (update software) by way of the mobile terminal.

(5) In the software update system, the server may be configured to determine the presence or absence of the update software to be applied to the ECU when the vehicle configuration information is received from the mobile terminal, transmit an acceptance request signal to the mobile terminal when the update software to be applied to the ECU is present, and distribute the update software to the mobile terminal when a transmission request is received from the mobile terminal; and the mobile terminal may be further configured to request a user to accept an update process for the software of the ECU when the acceptance request signal is received from the server, transmit the transmission request to the server when the update process is accepted by the user, instruct the ECU to execute installation of the update software to be transmitted to the vehicle, and instruct the ECU to execute activation of the installed update software.

With this configuration, when the vehicle configuration information is received from the mobile terminal, the server determines the presence or absence of the update software to be applied to the ECU, and transmits an acceptance request signal to the mobile terminal when the update software to be applied to the ECU is present. When the acceptance request signal is received from the server, the mobile terminal requests the user to accept the update process for the software of the ECU, and transmits a transmission request to the server when the update process is accepted by the user. When the transmission request is received from the mobile terminal, the server distributes the update software to the mobile terminal. The mobile terminal instructs the ECU to execute installation of the update software to be transmitted to the vehicle, and instructs the ECU to execute activation of the installed update software. Consequently, the update software (new software) distributed from the server is installed and activated as instructed by the mobile terminal, and thus it is not necessary to provide a device etc. exclusively for software update.

(6) In the software update system, the mobile terminal may be configured to acquire a load on the ECU, and instruct the ECU to suspend execution of the installation when the acquired load is equal to or more than a predetermined value.

With this configuration, the mobile terminal instructs the ECU to suspend execution of the installation when the load on the ECU is high at a predetermined value or more. The installation can be performed appropriately, since the installation is suspended when the target ECU is subjected to a high load and trouble would be caused if the installation were executed.

(7) In the software update system, the vehicle may be configured to transmit an update completion notification to the mobile terminal when the activation of the update software has been completed; and the mobile terminal may be configured such that, when communication between the vehicle and the mobile terminal breaks down since the update software is transmitted to the vehicle until the update completion notification is received, the mobile terminal requests the vehicle to transmit version information on the software installed in the ECU when the communication between the vehicle and the mobile terminal is restored.

With this configuration, the vehicle transmits an update completion notification to the mobile terminal when the activation of the update software has been completed. When communication between the vehicle and the mobile terminal breaks down since the update software is transmitted to the vehicle until the update completion notification is received, the mobile terminal requests the vehicle to transmit version information on the software installed in the ECU when the communication between the vehicle and the mobile terminal is restored. When communication between the vehicle and the mobile terminal breaks down since the update software is transmitted to the vehicle until the update completion notification is received, the software update process (installation or activation) may not be completed normally, or the update process may be suspended. The mobile terminal requests the vehicle to transmit version information on the software installed in the ECU when communication between the vehicle and the mobile terminal is restored. Thus, it is possible to determine whether the software update process has been performed normally based on the version information on the software transmitted from the vehicle.

With the present disclosure, it is possible to enable software update by the OTA technology even for vehicles that do not support the OTA access function.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 illustrates an example of a display screen displayed on a touch panel display of a human machine interface (HMI).

DETAILED DESCRIPTION OF EMBODIMENTS

An embodiment of the present disclosure will be described in detail with reference to the drawings. The same or corresponding portions are denoted by the same signs throughout the drawings, and description thereof will not be repeated.

Figure 1:
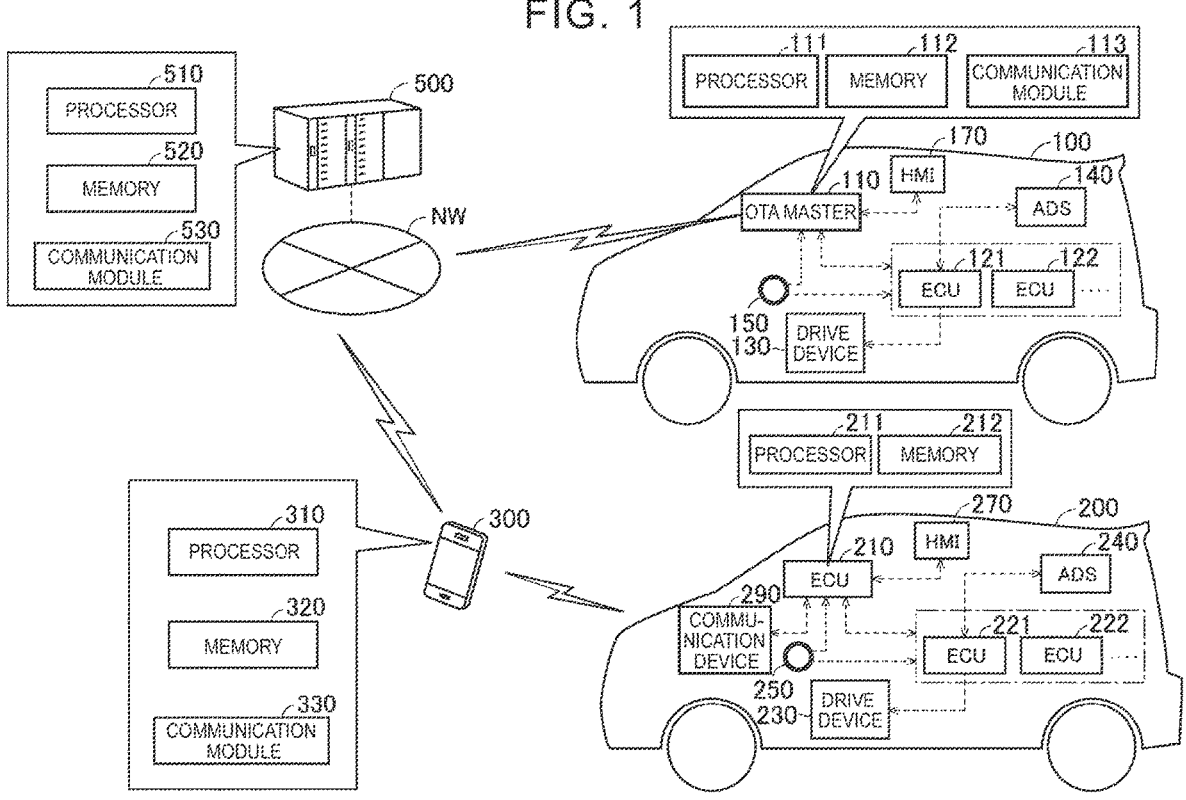
FIG. 1 illustrates the configuration of a software update system according to the present embodiment.

FIG. 1 illustrates the configuration of a software update system according to the present embodiment. With reference to FIG. 1, the software update system includes a vehicle 100, a vehicle 200, a user terminal 300, and an OTA center 500. "OTA" is an abbreviation for "Over The Air."

The vehicles 100, 200 are each a battery electric vehicle (BEV), for example. The vehicle 100 supports an OTA access function (a function of wirelessly communicating directly with the OTA center 500). The vehicle 200 does not support the OTA access function. The vehicle 100 can wirelessly communicate directly with the OTA center 500. The vehicle 200 cannot communicate with the OTA center 500 without using a different communication device (i.e. a communication device that is not a communication device of the vehicle 200 itself).

The OTA center 500 is a server that provides a vehicle software update service by the OTA technology. The OTA center 500 is configured to update software of an in-vehicle ECU remotely from the center by way of a communication block. The OTA center 500 distributes software for the in-vehicle ECU. The "ECU" means an electronic control unit.

The OTA center 500 includes a processor 510, a memory 520, and a communication module 530. The processor 510 includes a central processing unit (CPU), for example. The memory 520 includes a non-volatile memory such as a flash memory, for example. The communication module 530 is connected to a communication network NW through a wire, and communicates with each of a plurality of vehicles (including the vehicle 100) via the communication network NW. The communication network NW is a wide area network built by the Internet and wireless base stations, for example. The communication network NW may include a cellular telephone network.

The vehicle 100 includes an OTA master 110 and a plurality of ECUs (including ECUs 121, 122). The OTA master 110 includes a built-in computer, and functions as an in-vehicle diagnosis device. Each vehicle may include any number of ECUs. Each in-vehicle ECU includes a built-in computer that includes at least one processor and at least one memory. Each in-vehicle ECU may include a plurality of microcomputers in the form of a main microcomputer and a sub microcomputer, for example.

In the vehicle 100, the OTA master 110 and the ECUs are connected to each other via a communication bus, and configured to be capable of communicating with each other through a wire. The method of communication between control devices in each vehicle is not specifically limited, and a Controller Area Network (CAN) or an Ethernet (registered trademark) may be used, for example.

The OTA master 110 includes a processor 111, a memory 112, and a communication module 113. The processor 111 includes a CPU, for example. The memory 112 includes a non-volatile memory such as a flash memory, for example. The communication module 113 includes a communication interface (I/F) for wirelessly communicating directly with the OTA center 500. For example, wireless communication between the vehicle 100 (communication module 113) and the OTA center 500 is established by the communication module 113 accessing the communication network NW by specifying the address of the OTA center 500. The communication module 113 may include a telematics control unit (TCU) and/or a data communication module (DCM) that performs wireless communication.

The OTA master 110 of the vehicle 100 is configured to be capable of wirelessly communicating with the OTA center 500. The vehicle 100 can communicate with the OTA center 500 both while the vehicle 100 is stationary and while the vehicle 100 is traveling. The OTA master 110 manages in-vehicle information, receives a campaign, and manages a software update sequence.

The vehicle 100 is an autonomous driving vehicle configured to be capable of autonomous driving. The vehicle 100 is configured to be capable of both manned travel and unmanned travel. While the vehicle 100 is configured to be capable of unmanned autonomous driving, the vehicle 100 can also be manually driven by a user (manned travel). The vehicle 100 is also capable of autonomous driving (e.g. auto cruise control) during manned travel. The level of automated driving may be fully autonomous driving (level 5), or may be conditional autonomous driving (e.g. level 4).

The vehicle 100 includes a drive device 130 and an autonomous driving system (ADS) 140. In the vehicle 100, the ECU 121 is configured to control the drive device 130.

The drive device 130 includes an accelerator device, a brake device, and a steering device. The accelerator device includes a motor generator (hereinafter referred to as an "MG") that rotates driving wheels of the vehicle, a power control unit (PCU) that drives the MG, and a battery that supplies power for driving the MG to the PCU.

The ADS 140 includes a recognition sensor (e.g. at least one of a camera, a millimeter wave radar, and a lidar) that recognizes the external environment of the vehicle, and executes a process related to autonomous driving based on information sequentially acquired by the recognition sensor. The ADS 140 generates a travel plan (information that indicates the future behavior of the vehicle) that matches the external environment of the vehicle in cooperation with the ECU 121. Then, the ADS 140 requests the ECU 121 to control various actuators included in the drive device 130 so as to drive the vehicle 100 in accordance with the travel plan.

The vehicle 100 includes a start switch 150 and a human machine interface (HMI) 170.

The start switch 150 is a switch for the user to start a vehicle system (a control system for the vehicle 100), and is installed in a vehicle cabin, for example. In general, the start switch is referred to as a "power switch" or an "ignition switch". The vehicle system (including the ECUs mounted on the vehicle) is switched between on (activated) and off (deactivated) when the user operates the start switch 150. Performing an operation to turn on the start switch 150 starts the vehicle system in the deactivated state, and brings the vehicle system to the activated state (hereinafter also referred to as "IG on"). Meanwhile, performing an operation to turn off the start switch 150 when the vehicle system is activated brings the vehicle system to the deactivated state (hereinafter also referred to as "IG off").

The operation to turn on the start switch 150 is an operation to switch the state of the vehicle 100 from IG off to IG on. When the user performs an operation to turn on the start switch 150, a start request is input to each in-vehicle ECU. That is, each in-vehicle ECU receives a start request from the user. On the other hand, the operation to turn off the start switch 150 is an operation to switch the state of the vehicle from IG on to IG off. When the user performs an operation to turn off the start switch 150, a shutdown request is input to each in-vehicle ECU. That is, each in-vehicle ECU receives a shutdown request from the user. However, the operation to turn off the start switch 150 is prohibited while the vehicle is traveling.

The HMI 170 includes an input device and a display device. The HMI 170 may include a touch panel display that functions as the input device and the display device. The HMI 170 may include an input device and a display device of a car navigation system.

Figure 2:
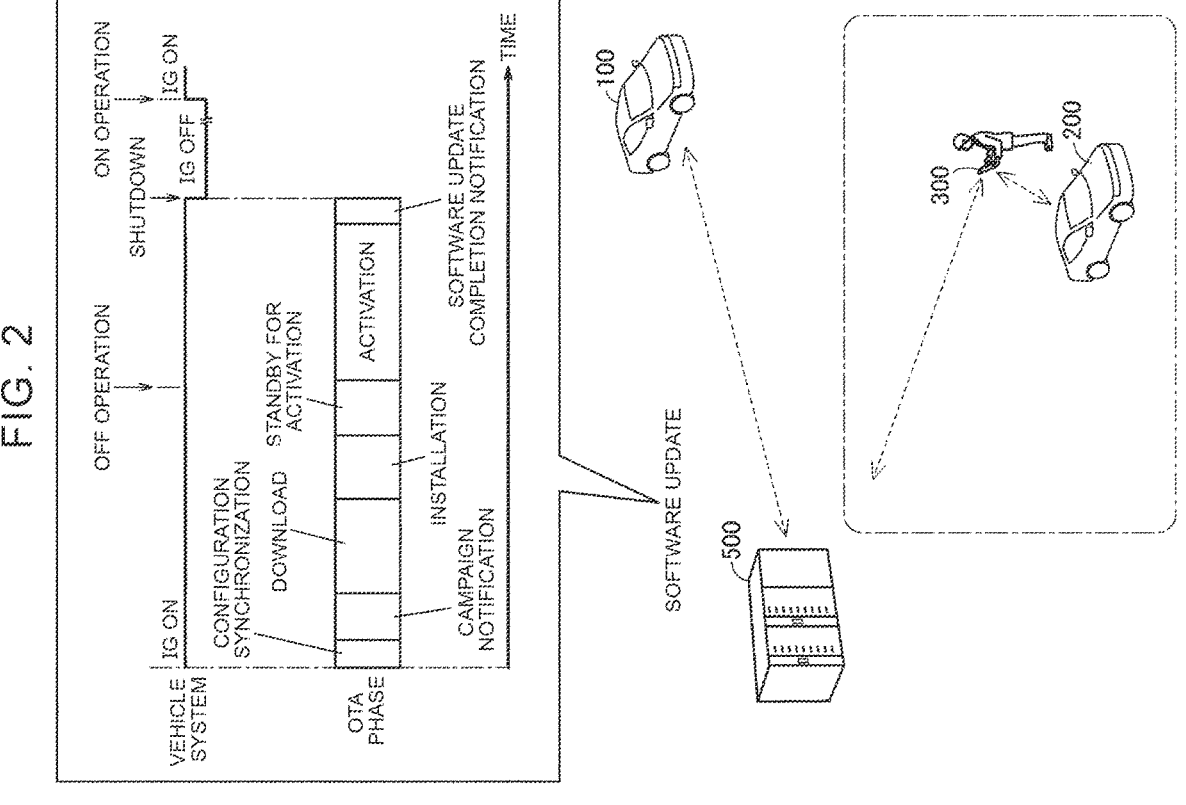
FIG. 2 illustrates an overview of a software update method for a vehicle 100 according to the present embodiment.

FIG. 2 illustrates an overview of a software update method for the vehicle 100 according to the present embodiment. With reference to FIG. 2 in addition to FIG. 1, a process related to software update (more particularly, update of vehicle software that uses the OTA technology) is performed in a procedure such as configuration synchronization, campaign notification and application acceptance, download, installation, activation, and software update completion notification. The process to be described below is executed by the OTA center 500 and each vehicle that receives software distribution from the OTA center 500. The number of vehicles that receive distribution from the OTA center 500 may be about 50, may be 100 or more and less than 1000, or may be 1000 or more.

The vehicle in the IG on state repeatedly executes configuration synchronization for each lapse of a time set in advance. In addition, the vehicle in the IG on state executes configuration synchronization also when a request for configuration synchronization is received from the OTA center 500. The configuration synchronization process by the vehicle includes transmitting a vehicle identification number (VIN) and vehicle configuration information to the OTA center 500. The vehicle configuration information includes hardware information (information that indicates a hardware model number, the identifier of the ECU, etc.) and software information (information that indicates a software model number, a version, etc.) for each ECU included in the vehicle, for example.

When the vehicle configuration information is received from the vehicle (OTA master 110), the OTA center 500 checks a campaign (software update) that is presently run. When there is any campaign that is applicable to the vehicle, the OTA center 500 transmits an acceptance request signal that requests the user of the vehicle to accept download of new software (update software) related to the campaign. The acceptance request signal includes information (campaign information) about the campaign. The campaign information may include at least one of campaign attribute information (information that indicates the purpose of the software update, the function of the vehicle that may be affected by the update, etc.), a list of vehicles as targets for the campaign, information (e.g. software information (e.g. version information) before and after the update) about ECUs as targets for the campaign, and information about a notification to be sent to the user before and after the update, for example. The campaign indicated by the notification may be a newly run campaign, or may be a campaign that was not applied previously. Hereinafter, transmission of the acceptance request signal is occasionally referred to as a "campaign notification".

When a campaign notification (acceptance request signal) is received, the vehicle (OTA master 110) requests the user to input whether to accept application of the campaign. For example, the vehicle (OTA master 110) requests the user to input whether to "accept" or "decline" the application by displaying a message such as "New software has been found. Would you like to apply it to this vehicle?" on the in-vehicle HMI (HMI 170). When an input that indicates "accept" is made, the vehicle executes the process related to download to be described below. When an input that indicates "decline" is made, on the other hand, the vehicle does not execute the process related to download. In this case, the OTA center 500 ends the process related to software update without proceeding to a download phase.

In this embodiment, the OTA center 500 and the OTA master 110 of the vehicle execute a process related to download in the procedure to be described below.

The OTA master 110 of the vehicle requests the OTA center 500 for a distribution package including the new software (update software). Then, the OTA master 110 downloads (receives and saves) the distribution package from the OTA center 500. The distribution package may include, in addition to the new software (e.g. a set of update data for each of the ECUs as targets for the campaign), package attribute information (information that indicates the update section, the number of update data in the distribution package, the order of installation for the ECUs, etc.) and update data attribute information (such as the identifier of the target ECU, verification data for verifying the correctness of the update data, and version information on the software). The target ECU is an ECU as the target for the software update. The target ECU may be the ECU 121, and the software to be updated may be an autonomous driving control program, for example.

The distribution package is saved in a storage device (e.g. the memory 112) of the OTA master 110 through the process related to download discussed above. After the completion of the download, the OTA master 110 verifies the authenticity of the downloaded distribution package. When the verification result is "normal", the OTA master 110 notifies the OTA center 500 of the software update state (completion of download). When this notification is made, it is meant that the download has been successfully performed.

When the download is successfully performed, the vehicle executes installation. The OTA master 110 requests at least one target ECU (e.g. the ECU 121) to output the state of the target ECU and a diagnostic trouble code (DTC). The OTA master 110 determines whether installation can be executed for each target ECU based on the state of the target ECU and the DTC. Then, the OTA master 110 transfers the new software (update data) to the target ECU for which installation can be executed. When the update data are received, the target ECU executes installation (writing into the non-volatile memory) of the update data.

When the transfer of the update data from the OTA master 110 to the target ECU is completed, the target ECU transmits a transfer completion notification to the OTA master 110. When the transfer completion notification is received, the OTA master 110 requests the target ECU for integrity verification. When this request is received, the target ECU performs verification using integrity verification data (verification data), and transmits the verification result to the OTA master 110. The OTA master 110 saves the verification result (completion/failure/cancellation of installation) for each target ECU. When the integrity verification is completed for all the target ECUs and the verification result is "normal" for all the target ECUs, the OTA master 110 notifies the OTA center 500 of the software update state (completion of installation). When this notification is made, it is meant that the installation has been successfully performed.

When the installation is successfully performed in succession to the download, the vehicle 100 stands by for activation. After that, when an operation to turn off the start switch 150 of the vehicle is performed, the OTA master 110 causes the HMI 170 to display a predetermined message to request the user to make an input that indicates one of "accept" and "decline". When the user makes an input that indicates "accept", the OTA master 110 executes activation (activation of the installed software). When the OTA master 110 fails in the activation, the OTA master 110 requests the OTA center 500 for a rollback of the software. When a request for a rollback is received from the vehicle, the OTA center 500 distributes software for a rollback to the vehicle. This allows the OTA master 110 to return (roll back) the software that could not be activated to the original version using the software for a rollback. When the user makes an input that indicates "decline", meanwhile, the OTA master 110 stops the process related to software update without executing the activation, and shuts down the vehicle system.

When the OTA master 110 succeeds in the activation, the OTA master 110 causes the HMI 170 to display the result of the software update. After that, the OTA master 110 notifies the OTA center 500 of the software update state (completion of software update). When this notification is made, it is meant that the OTA software update has been successfully performed. When this notification is made, the control system for the vehicle is shut down, and switched to IG off. After that, when an operation to turn on the start switch 150 of the vehicle is performed, the vehicle system is switched to IG on. This allows the update program (software of the new version) to be started in the target ECU. The software to be updated is not limited to a control program for a drive assist system such as the autonomous driving control program to be discussed above, and may be any program.

In this manner, the vehicle 100 can update software by the OTA technology by communicating with the OTA center 500 and using the OTA master 110 that controls software update. However, the vehicle 200 does not include the OTA master 110 (does not support an OTA access function), and cannot update software using the OTA technology. The present embodiment enables even the vehicle 200 that does not include the OTA master 110 to update software using the OTA technology, by adding the function of the OTA master 110 to a mobile terminal carried by the user of the vehicle 200.

With reference to FIG. 1, an ECU 210 of the vehicle 200 includes a processor 211 and a memory 212. The processor 211 includes a CPU, for example. The memory 212 includes a non-volatile memory such as a flash memory, for example. The ECU 210 may be a gateway (GW)-ECU, for example. The vehicle 200 includes a communication device 290. The ECU 210 communicates with devices outside the vehicle through the communication device 290. The communication device 290 includes a communication interface (UF) for wirelessly communicating directly with the user terminal 300. The communication device 290 and the user terminal 300 may perform short-range communication such as wireless LAN, NFC, or Bluetooth (registered trademark). The communication device 290 may communicate directly with the user terminal 300 that is located in the vehicle or in a range around the vehicle. Information may be exchanged via the communication device 290 between the user terminal 300 inside or outside the vehicle and the ECU 210 while the vehicle 200 is stationary. Meanwhile, information may be exchanged via the communication device 290 between the user terminal 300 inside the vehicle and the ECU 210 while the vehicle 200 is traveling.

The configuration of the vehicle 200 is substantially equivalent to that of the vehicle 100. In the vehicle 200, the ECUs are connected to each other via a communication bus, and are configured to be capable of CAN communication, for example. An ECU 221 corresponds to the ECU 121, an ECU 222 corresponds to the ECU 122, a drive device 230 corresponds to the drive device 130, an ADS 240 corresponds to the ADS 140, a start switch 250 corresponds to the start switch 150, and an HMI 270 corresponds to the HMI 170.

The user terminal 300 is configured to be carried by a user. The user terminal 300 is a mobile terminal carried and operated by a user (vehicle manager) of the vehicle 200. In this embodiment, a smartphone provided with a touch panel display (display unit) is adopted as the user terminal 300. The smartphone includes a built-in computer, and has a speaker function. However, this is not limiting, and any terminal that can be carried by the user of the vehicle 200 can be adopted as the user terminal 300. For example, a laptop computer, a tablet terminal, a portable gaming device, a wearable device (such as a smartwatch, smartglasses, and smartgloves), etc. can be adopted as the user terminal 300.

The user terminal 300 includes a processor 310, a memory 320, and a communication module 330. The processor 310 includes a CPU, for example. The memory 320 includes a non-volatile memory such as a flash memory, for example. The communication module 330 includes a communication interface (I/F) for wirelessly communicating directly with the OTA center 500. The communication module 330 also includes a communication OF for wirelessly communicating directly with the vehicle 200. This enables the vehicle 200 and the OTA center 500 to exchange data by way of the user terminal 300. Data can be exchanged between the vehicle 200 and the OTA center 500 by way of the user terminal 300 by the user terminal 300 accessing the communication network NW by specifying the address of the OTA center 500.

Application software (hereinafter referred to as a "mobile app") for using a service provided by the OTA center 500 is installed in the user terminal 300. The mobile app allows identification information (terminal identifier (ID)) on the user terminal 300 to be registered in the OTA center 500 in association with identification information (vehicle ID) on the vehicle 200. The user terminal 300 can exchange information with the OTA center 500 through the mobile app. The mobile app also allows the user terminal 300 to achieve the same function as the OTA master 110.

Figure 3:
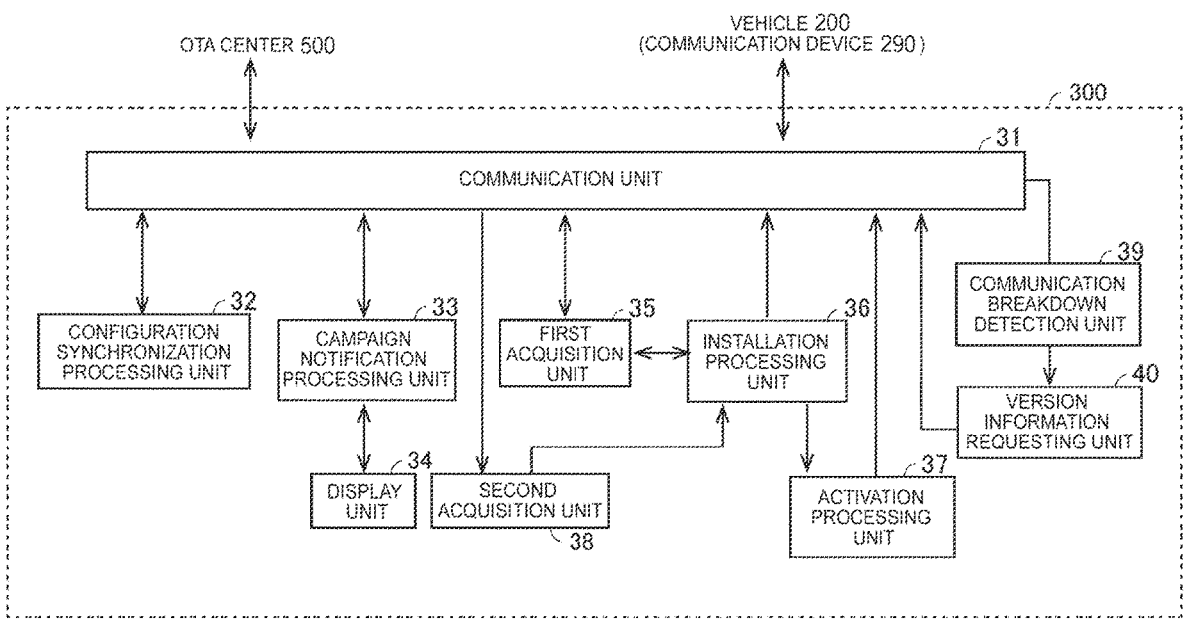
FIG. 3 illustrates an example of functional blocks constituted in a user terminal.
Figure 4:
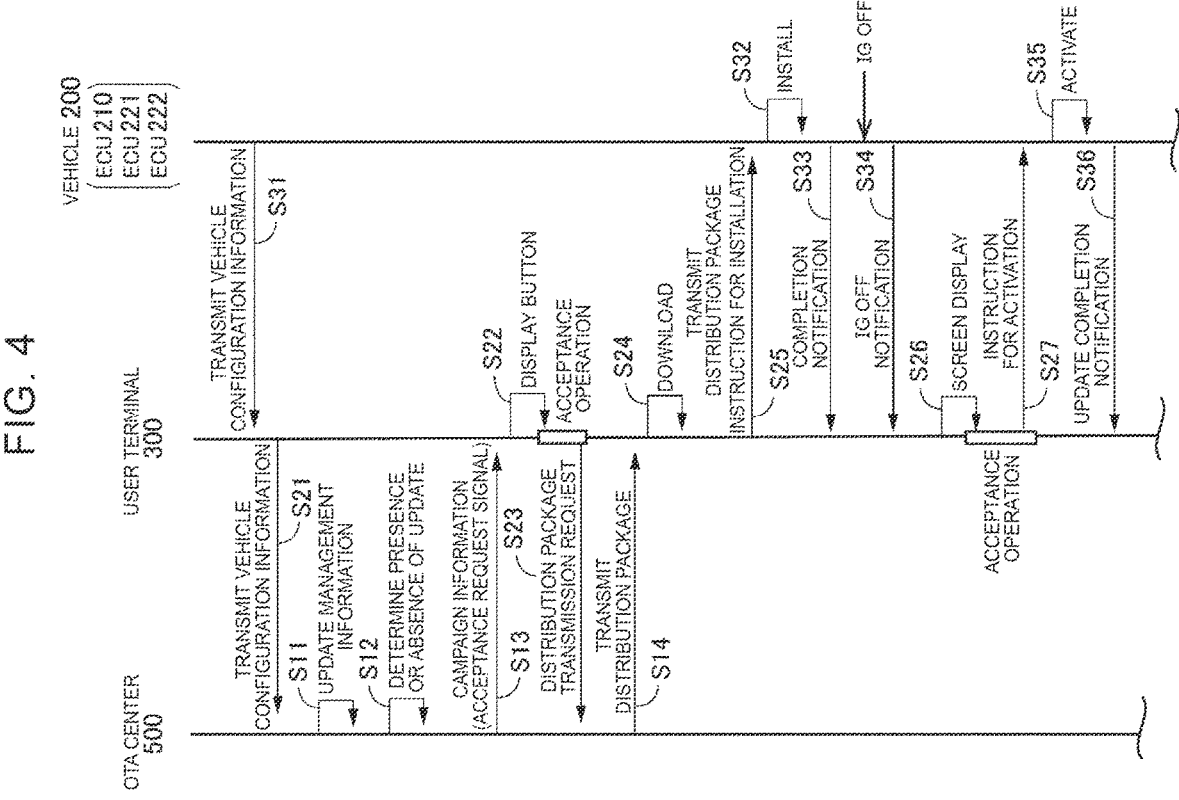
FIG. 4 schematically illustrates a part of a sequence of a software update process executed in a vehicle 200.

FIG. 3 illustrates an example of functional blocks constituted in the user terminal 300. These functional blocks indicate functions configured by the processor, the memory, the communication module, etc. FIG. 4 schematically illustrates a part of a sequence of a software update process executed in the vehicle 200 according to the present embodiment. This sequence is processed in the OTA center 500, the user terminal 300, and the vehicle 200 (ECUs 210, 221, 222). This process is implemented in the devices by one or more processors reading and executing a program stored in one or more memories.

In FIG. 3, a communication unit 31 communicates with the OTA center 500 (communication module 530) and the vehicle 200 (communication device 290). The communication unit 31 may be the communication module 330. A configuration synchronization processing unit 32 acquires vehicle configuration information including information on the ECUs 210, 221, 222 of the vehicle 200, and transmits the vehicle configuration information to the OTA center 500.

In FIG. 4, when the vehicle 200 is brought to the IG on state, the vehicle 200 transmits the vehicle identification number (VIN) and the vehicle configuration information, including hardware information and software information on the ECUs 210, 221, 222, to the user terminal 300 as discussed above for each lapse of a time set in advance or upon receiving a request for configuration synchronization from the configuration synchronization processing unit 32 in step (hereinafter step is abbreviated as "S") 31. When the vehicle configuration information is acquired from the vehicle 200, the configuration synchronization processing unit 32 transmits the acquired vehicle configuration information to the OTA center 500 (S21).

When the vehicle configuration information is received, the OTA center 500 updates management information (S11). When update of the management information is finished, the OTA center 500 determines the presence or absence of update software (the presence or absence of an applicable campaign) to be applied to the vehicle 200 (ECUs 210, 221, 222) (S12). When there is a campaign (update software) to be applied to the vehicle 200, the OTA center 500 transmits campaign information, including an acceptance request signal, to the user terminal 300 (S13).

Figure 5:
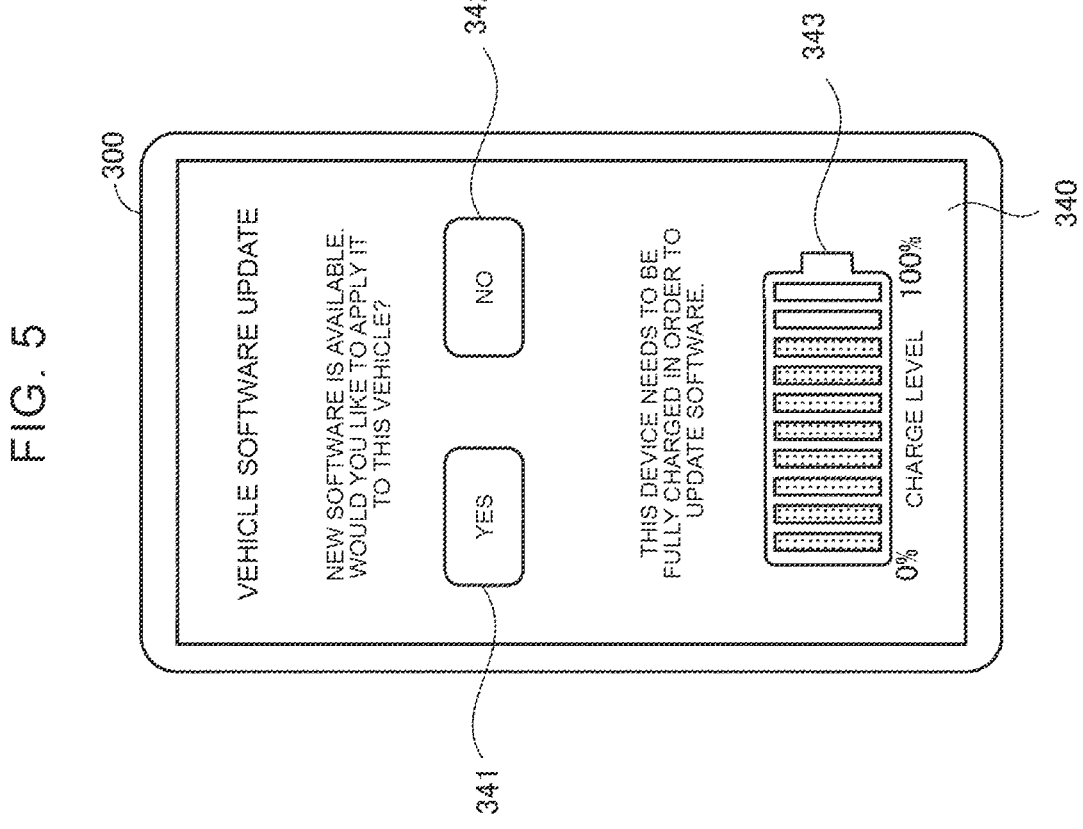
FIG. 5 illustrates an example of a display screen displayed on a touch panel display of the user terminal.

When the campaign information (acceptance request signal) is received from the OTA center 500, the user terminal 300 causes the campaign notification processing unit 33 (see FIG. 3) to display an operation unit (operation button) on the display unit 34 (S22). FIG. 5 illustrates an example of a display screen displayed on a touch panel display 340 of the user terminal 300. The touch panel display 340 corresponds to an example of the display unit 34. As illustrated in FIG. 5, the touch panel display 340 displays an operation unit for accepting a software update process together with a message for a vehicle software update process. In FIG. 5, a "yes" button 341 is the operation unit (operation button) for accepting download.

With reference to FIG. 4 again, when the "yes" button 341 displayed on the touch panel display 340 is operated by the user, software download (software update process) is accepted by the user, and the user terminal 300 (campaign notification processing unit 33) transmits a distribution package transmission request to the OTA center 500 (S23). When a "no" button 342 displayed on the touch panel display 340 is operated by the user, software download (software update process) is not executed, and the present sequence is ended. The touch panel display 340 may display a charge level 343 of a battery of the user terminal 300. The charge level 343 indicates the present charge level of the battery, and may indicate the state of charge (SOC) of the battery of the user terminal 300, for example.

When the distribution package transmission request is received from the user terminal 300, the OTA center 500 transmits a distribution package (update software) to the user terminal 300 (S14). When the distribution package transmitted (distributed) from the OTA center 500 is received, the user terminal 300 acquires the distribution package using a first acquisition unit 35 (see FIG. 3). The first acquisition unit 35 saves the distribution package in the memory 320, and downloads the distribution package (S24). When download of the distribution package is completed, an installation processing unit 36 (see FIG. 3) of the user terminal 300 verifies the authenticity of the distribution package etc., and thereafter transmits the distribution package (update software (update data)) to the vehicle 200, and instructs the vehicle 200 to execute installation of the update data (S25). When the update data are received, the target ECU of the vehicle 200 executes installation (writing into the non-volatile memory) of the update software (S32).

When the installation of the update software is completed, the target ECU of the vehicle 200 transmits a completion notification to the user terminal 300 (S33). When the IG off state is established by operating the start switch 250 after the completion of the installation, the vehicle 200 transmits an IG off notification to the user terminal 300 (S34).

Figure 6:
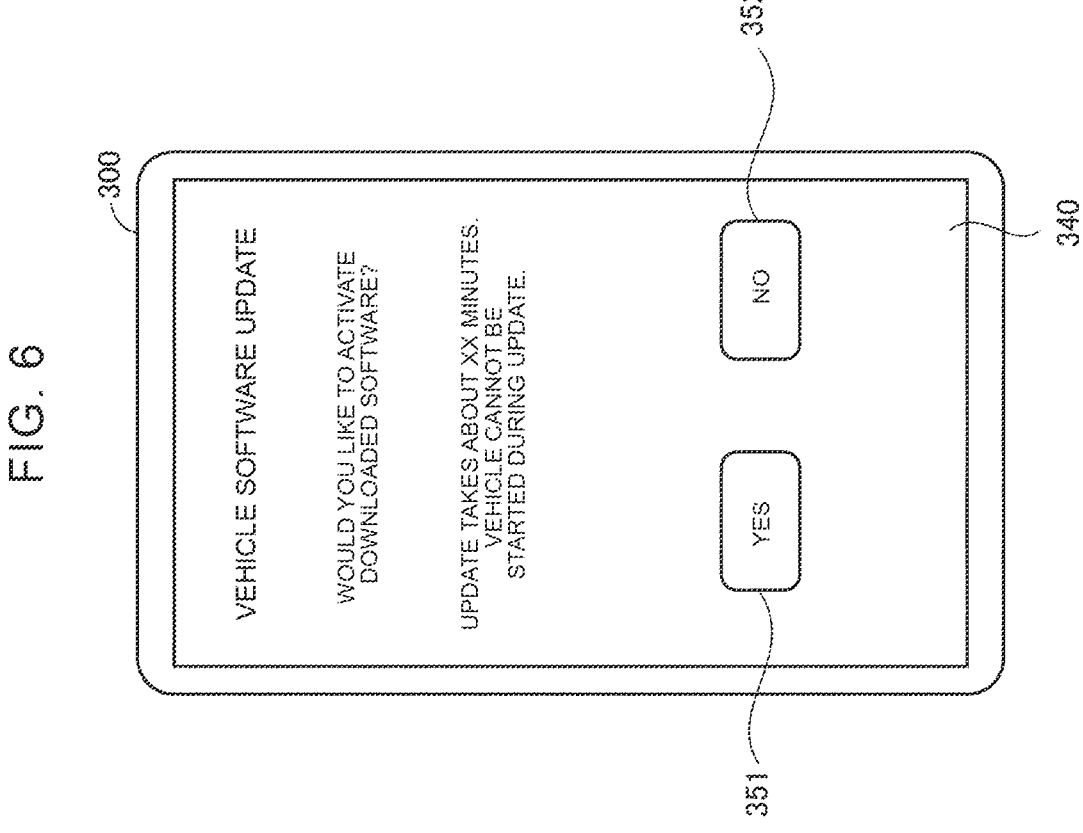
FIG. 6 illustrates an example of a display screen displayed on the touch panel display of the user terminal.

When the IG off notification is received, the user terminal 300 displays an operation unit (operation button) on the touch panel display 340 (display unit 34) (S26). FIG. 6 illustrates an example of a display screen displayed on the touch panel display 340 of the user terminal 300. As illustrated in FIG. 6, the touch panel display 340 displays an operation unit for accepting activation of the software together with a message for a vehicle software update process. In FIG. 6, a "yes" button 351 is the operation unit (operation button) for accepting activation.

With reference to FIG. 4 again, when the "yes" button 351 displayed on the touch panel display 340 is operated by the user, software activation (software activation process) is accepted by the user, and an activation processing unit 37 (see FIG. 3) of the user terminal 300 transmits an activation instruction to the vehicle 200 (S27). When a "no" button 352 displayed on the touch panel display 340 is operated by the user, the software update process is suspended, and the present sequence is ended.

When the activation instruction is received from the user terminal 300, the vehicle 200 (target ECU) executes activation of the installed update software (S35). When the activation is successfully performed, the vehicle 200 (target ECU) transmits an update completion notification to the user terminal 300 (S36).

Figure 7:
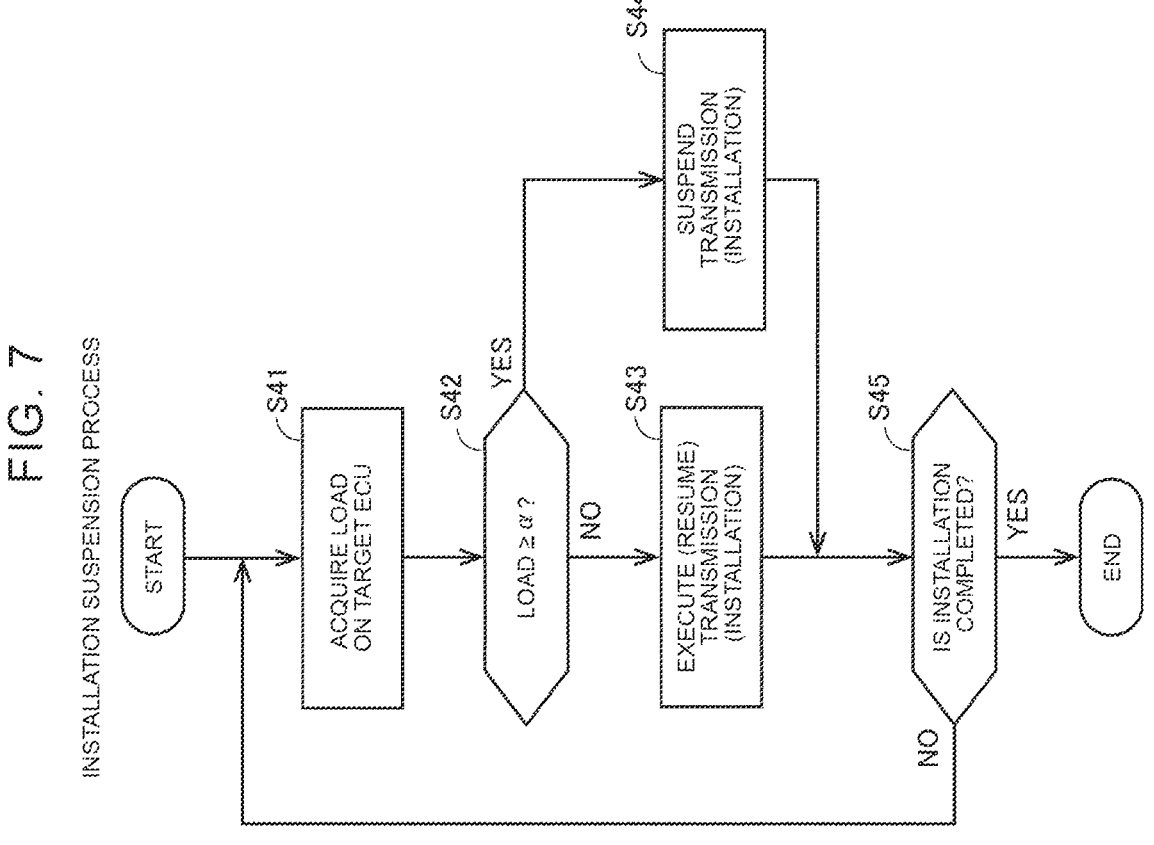
FIG. 7 is a flowchart illustrating an installation suspension process executed by the user terminal.

FIG. 7 is a flowchart illustrating an installation suspension process executed by the user terminal 300. This flowchart is started when S25 (transmission of distribution package, instruction of installation) in the sequence in FIG. 4 is executed. First, in S41, a second acquisition unit (see FIG. 3) acquires a load on the target ECU (ECU in which update software is to be installed). The load on the target ECU may be the CPU utilization (CPU load factor) of the target ECU, for example. The CPU utilization is transmitted from each target ECU to the user terminal 300 via the communication device 290.

In the following S42, it is determined whether the load (CPU utilization) on the target ECU is equal to or more than a predetermined value $\alpha$. The predetermined value $\alpha$ is determined such that control for a device controlled by the target ECU is inconveniently affected when installation is executed with the processing load on the target ECU exceeding the predetermined value $\alpha$. The predetermined value $\alpha$ may be set in advance. When the load on the target ECU is less than the predetermined value $\alpha$ (load<$\alpha$), a negative determination is made, and the process proceeds to S43. When the load is equal to or more than the predetermined value $\alpha$ (load$\geq\alpha$), a positive determination is made, and the process proceeds to S44.

In S43, the installation processing unit 36 transmits the distribution package and instructs the vehicle 200 to execute installation, and the process proceeds to S45. When transmission of the distribution package has been suspended, the transmission of the distribution package is resumed, and the process proceeds to S45.

In S44, the installation processing unit 36 suspends the transmission of the distribution package and instructs the vehicle 200 (target ECU) to suspend the installation, and the process proceeds to S45.

In S45, it is determined whether the installation has been completed in the target ECU. When a completion notification (S33) has not been received from the vehicle 200 (target ECU), a negative determination is made, and the process returns to S41. When a completion notification (S33) has been received, a positive determination is made, and the current routine is ended.

The load on the target ECU is not necessarily the CPU utilization, and may be a parameter correlated with the CPU utilization (CPU load factor). For example, when the target ECU is an ECU that controls the MG (motor generator), the rotational speed of the MG may be used as the load on the ECU. When the vehicle 200 includes an internal combustion engine and the target ECU is an engine ECU, the engine rotational speed may be used as the load on the ECU. The computation load on the ECU (CPU) is higher as the rotational speed of the MG or the internal combustion engine is higher. Thus, a positive determination may be made in S42 when the rotational speed of the MG is equal to or more than a predetermined value or when the engine rotational speed is equal to or more than a predetermined value. In this case, the predetermined value is preferably set in consideration of the speed of communication (a delay in communication) between the user terminal 300 and the vehicle 200.

Figure 8:
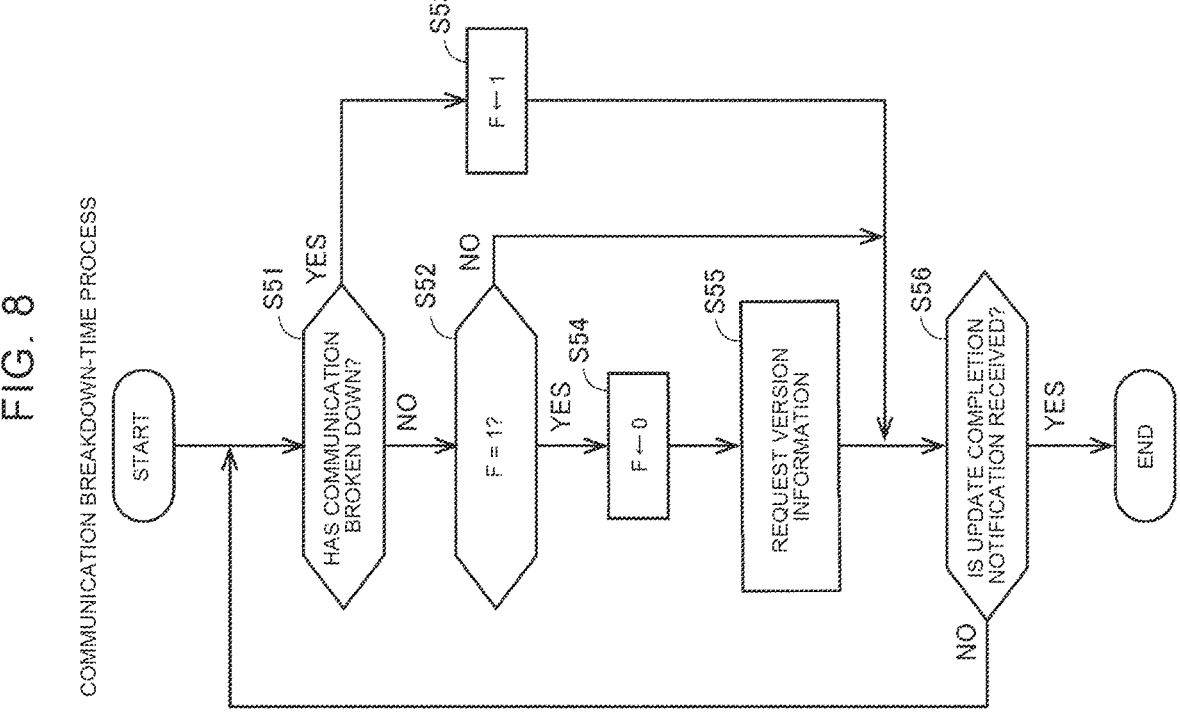
FIG. 8 is a flowchart illustrating a communication breakdown-time process executed by the user terminal.

FIG. 8 is a flowchart illustrating a communication breakdown-time process executed by the user terminal 300. This flowchart is started when S25 (transmission of distribution package, instruction of installation) in the sequence in FIG. 4 is executed. First, in S51, a communication breakdown detection unit 39 (see FIG. 3) of the user terminal 300 determines whether communication between the vehicle 200 (communication device 290) and the user terminal 300 (communication unit 31) has broken down. For example, when the vehicle 200 and the user terminal 300 communicate with each other using Bluetooth (registered trademark), it may be determined that communication has broken down when a received signal strength indicator (RSSI) is equal to or less than a predetermined value, a bit error rate (BER) is equal to or more than a predetermined value, etc. When communication has not broken down, a negative determination is made in S51, and the process proceeds to S52. When communication has broken down, a positive determination is made in S51, and the process proceeds to S53, where a flag F is set to 1, and thereafter proceeds to S56.

In S52, it is determined whether the flag F is 1. When the flag F is 1, a positive determination is made, and the process proceeds to S54, where the flag F is set to 0, and thereafter proceeds to S55. When the flag F is 0, a negative determination is made in S52, and the process proceeds to S56.

In S55, a version information requesting unit 40 (see FIG. 3) requests the vehicle 200 to transmit version information on the software installed in the target ECU (transmits a version information transmission request to the target ECU), and the process proceeds to S56. S55 is processed when communication is restored (a negative determination is made in S51) after communication has been broken down (the flag F is set to 1). In S56, it is determined whether the user terminal 300 has received an update completion notification. When the update completion notification (S36) has not been received, a negative determination is made in S56, and the process returns to S51. When the update completion notification (S36) has been received, a positive determination is made in S56, and the current routine is ended.

In this embodiment, the user terminal 300 can communicate with the vehicle 200 and the OTA center 500. The configuration synchronization processing unit 32 of the user terminal 300 acquires vehicle configuration information including information on the ECUs mounted on the vehicle 200, and transmits the vehicle configuration information to the OTA center 500. This enables the OTA center 500 to distribute new (update) software to be applied to the vehicle 200 to the user terminal 300. The first acquisition unit 35 of the user terminal 300 acquires the software distributed from the OTA center 500. Then, the user terminal 300 transmits the software acquired by the first acquisition unit 35 to the vehicle 200 via the communication unit 31. In this manner, the vehicle 200 can update software by the OTA technology by obtaining new software by way of the user terminal 300.

In this embodiment, the campaign notification processing unit 33 of the user terminal 300 requests the user to accept an update process for software of the ECU based on an acceptance request signal (S13) distributed from the OTA center 500. This enables the software to be updated when the user accepts update of the software. The installation processing unit 36 of the user terminal 300 instructs the ECU to execute installation of the software transmitted to the vehicle 200, and the activation processing unit 37 instructs the ECU to execute activation of the installed software. The software (new software) distributed from the OTA center 500 is installed and activated as instructed by the user terminal 300, and thus it is not necessary to provide the OTA master 110 exclusively for software update.

In this embodiment, the second acquisition unit 38 of the user terminal 300 acquires the processing load on the target ECU. Then, the user terminal 300 provides an instruction to suspend execution of the installation when the load on the target ECU is high at a predetermined value or more. This enables the installation to be performed appropriately, since the installation is suspended when the target ECU is subjected to a high load and trouble would be caused if the installation were executed.

In this embodiment, the OTA center 500 determines the presence or absence of update software to be applied to the ECU when vehicle configuration information is received from the user terminal 300 (S12), and transmits an acceptance request signal to the user terminal 300 when there is update software to be applied to the ECU (S13). The user terminal 300 requests the user to accept an update process for software of the ECU when the acceptance request signal is received from the OTA center 500 (S22), and transmits a transmission request to the OTA center 500 when the update process is accepted by the user (S23). When the transmission request is received from the user terminal 300, the OTA center 500 distributes update software to the user terminal 300 (S14). The user terminal 300 instructs the target ECU to execute installation of the update software to be transmitted to the vehicle 200 (S25), and instructs the target ECU to execute activation of the installed update software (S27). Consequently, the update software (new software) distributed from the server is installed and activated as instructed by the user terminal 300, and thus it is not necessary to provide the OTA master 110 exclusively for software update.

In this embodiment, the vehicle 200 transmits an update completion notification to the user terminal 300 when the activation of update software has been completed (S36). When communication between the vehicle 200 and the user terminal 300 breaks down (a positive determination is made in S51) since update software is transmitted to the vehicle 200 until an update completion notification is received, the user terminal 300 requests the vehicle 200 to transmit version information on the software installed in the target ECU (S55) when communication between the vehicle 200 and the user terminal 300 is restored (a positive determination is made in S52). When communication between the vehicle 200 and the user terminal 300 breaks down since update software is transmitted to the vehicle 200 until an update completion notification is received, the software update process (installation or activation) may not be completed normally, or the update process may be suspended. The user terminal 300 requests the vehicle 200 to transmit version information on the software installed in the target ECU when communication between the vehicle 200 and the user terminal 300 is restored. Thus, it is possible to determine whether the software update process has been performed normally based on the version information on the software transmitted from the vehicle 200.

In the above embodiment, in S22 (FIG. 4), an operation unit for accepting a software update process is displayed on the touch panel display 340 of the user terminal 300 together with a message for a vehicle software update process (see FIG. 5). However, similar display may be made on the HMI 270 of the vehicle 200. FIG. 9 illustrates an example of a display screen displayed on a touch panel display 610 of the HMI 270. As illustrated in FIG. 9, a touch panel display 610 displays an operation unit for accepting a software update process together with a message for a vehicle software update process. In FIG. 9, a "yes" button 611 is an operation unit (operation button) for accepting download. When the "yes" button 611 is operated by the user, software download (software update process) is accepted by the user, and the user terminal 300 transmits a distribution package transmission request to the OTA center 500. When a "no" button 622 displayed on the touch panel display 610 is operated by the user, software download (software update process) is not executed, and the sequence in FIG. 4 is ended. In S26 (FIG. 4), an operation unit for accepting software activation displayed on the touch panel display 340 of the user terminal 300 may similarly be displayed on the HMI 270 of the vehicle 200.

While various types of information are displayed on the touch panel display 340 in the above description, the display is not limited to one having a touch panel function, and may be a device (such as a personal computer (PC)) provided with an operation unit separately from a display.

It is not essential that the vehicle should be configured to be capable of autonomous driving. The vehicle may be an xEV (electrified vehicle) other than a BEV. The vehicle may be a plug-in hybrid electric vehicle (PHEV) or a hybrid electric vehicle (HEV) that includes an internal combustion engine (e.g. a gasoline engine, a biofuel engine, or a hydrogen engine), or may be a vehicle that includes only an internal combustion engine. The vehicle is not limited to a four-wheeled passenger vehicle, and may be a bus or a truck, or may be a three-wheeled xEV. The vehicle may have a flight function. The vehicle may be a Mobility as a Service (MaaS) vehicle. The vehicle may be a multi-purpose vehicle to be customized in accordance with the purpose of use of the user. The vehicle may be a mobile shop vehicle, a robotaxi, an automated guided vehicle (AGV), or an agricultural machine. The vehicle may be a small unmanned or single-seater BEV (e.g. a last-mile BEV, an electric wheelchair, or an electric skateboard).

The embodiment disclosed herein should be construed as illustrative in all respects and not restrictive. The scope of the present disclosure is indicated by the claims rather than by the description of the above embodiment, and intended to include all changes that fall within the meaning and scope equivalent to the claims.

What is claimed is:

1. A mobile terminal, wherein the mobile terminal is a device carried by a user, the mobile terminal comprising:
   one or more processors configured to
      acquire vehicle configuration information including information on an electronic control unit (ECU) mounted on a vehicle and transmit the vehicle configuration information to a server; and
      acquire software for the ECU distributed from the server; and
   a communication module configured to transmit the acquired software to the vehicle, wherein
   the one or more processors of the mobile terminal are further configured to:
      acquire update software for the ECU distributed from the server;
      transmit the acquired update software to the vehicle;
      request the user to accept an update process for the software of the ECU when an acceptance request signal is received from the server;
      transmit a transmission request to the server when the update process is accepted by the user;

instruct the ECU to execute installation of the update software transmitted to the vehicle;
instruct the ECU to execute activation of the installed update software; and wherein when communication between the vehicle and the mobile terminal breaks down, since the update software is transmitted to the vehicle until an update completion notification that activation of the update software has been completed is received from the vehicle by the mobile terminal, the mobile terminal requests the vehicle to transmit version information on the software installed in the ECU when the communication between the vehicle and the mobile terminal is restored.

2. The mobile terminal according to claim 1, wherein the one or more processors are configured to:
   acquire a load on the ECU; and
   instruct the ECU to suspend execution of the installation when the acquired load is equal to or more than a predetermined value.

3. A software update system configured to update software of an electronic control unit (ECU), comprising:
   a server configured to distribute the software;
   a vehicle on which the ECU is mounted; and
   a mobile terminal configured to communicate with the server and the vehicle, wherein
   the mobile terminal is a device carried by a user,
   the mobile terminal is configured to
      acquire vehicle configuration information including information on the ECU from the vehicle,
      transmit the acquired vehicle configuration information to the server,
      acquire update software distributed from the server,
      transmit the acquired update software to the vehicle,
      request the user to accept an update process for the software of the ECU when an acceptance request signal is received from the server,
      transmit a transmission request to the server when the update process is accepted by the user;
      instruct the ECU to execute installation of the update software transmitted to the vehicle; and
      instruct the ECU to execute activation of the installed update software, wherein when communication between the vehicle and the mobile terminal breaks down, since the update software is transmitted to the vehicle until an update completion notification that activation of the update software has been completed is received from the vehicle by the mobile terminal, the mobile terminal requests the vehicle to transmit version information on the software installed in the ECU when the communication between the vehicle and the mobile terminal is restored, and
   the server is configured to
      determine presence or absence of the update software to be applied to the ECU when the vehicle configuration information is received from the mobile terminal, and distribute the update software to the mobile terminal when the update software to be applied to the ECU is present.

4. The software update system according to claim 3, wherein the mobile terminal is configured to acquire a load on the ECU, and instruct the ECU to suspend execution of the installation when the acquired load is equal to or more than a predetermined value.

\* \* \* \* \*